March 21, 1950

L. C. HUCK 2,501,567

RIVET

Filed May 19, 1944

INVENTOR.
Louis C. Huck.
BY
Harness, Dickey & Pierce.
ATTORNEYS.

March 21, 1950 L. C. HUCK 2,501,567
RIVET
Filed May 19, 1944 3 Sheets-Sheet 2

INVENTOR.
Louis C. Huck,
BY
Harness, Dickey & Pierce
ATTORNEYS.

March 21, 1950      L. C. HUCK      2,501,567
RIVET Filed May 19, 1944      3 Sheets-Sheet 3

INVENTOR.
Louis C. Huck.
BY
Harness, Dickey & Pierce.
ATTORNEYS.

Patented Mar. 21, 1950

2,501,567

UNITED STATES PATENT OFFICE 2,501,567

RIVET

Louis C. Huck, Grosse Pointe, Mich., assignor, by mesne assignments, to Huck Manufacturing Company, Detroit, Mich., a corporation of Michigan Application May 19, 1944, Serial No. 536,271

22 Claims. (Cl. 85—40)

The invention relates to riveting and it has particular relation to a two-part rivet adapted to be set from one side of a structure to be riveted.

A form of rivet which has been developed heretofore comprises a tubular member having a head for engaging one side of a structure to be riveted, and a body portion adapted to project from the other side of the structure and to be enlarged to provide a head. The enlargement is formed by means of a pin projecting through the tubular member and which has a head of sufficiently large diameter that when the pin is moved through the member, the head on the pin expands the projecting body. The head formed is of "tulip" character, or, in other words, the wall of the projecting portion is expanded so as to increase both its inner and outer diameters. This type of rivet may also include a pin portion adjacent the head on the pin which expands the tubular body initially in order to fill the opening in the structure prior to forming the "tulip" head. In general, this form of rivet is embodied in Wylie British Patent No. 106,169, of 1917.

One definite disadvantage of this type of rivet is that the free end of the tulip head on the tubular member may split or burst when expanded by the head on the pin. This splitting of the tulip head has heretofore been generally avoided either by using a metal in the tubular member which was not as hard as preferred or by limiting the expansion so as to reduce the bursting stresses at the free end of the tulip head. Any increase in ductility or decrease in hardness of the metal in the tubular member in this type of rivet reduces the strength and rigidity characteristics of the riveted joint and if the hardness of the tubular member is increased, the expansion must be reduced to avoid bursting or splitting.

In connection with the filling of the opening in the structure by means of an enlarged portion on the pin adapted to expand the tubular member when it moves through the latter, several results normally are possible. First, the clearance in the opening around the tubular member may be filled by expansion of the metal. Secondly, if the clearance is less than the amount of metal available to fill it, the opening may be enlarged by the excess metal. Again, and depending upon resistance to enlargement of the opening, the excess metal may cause axial extrusion of the tubular member. Finally, and depending on resistance to movement of metal in the tubular member, the enlarged portion on the pin may wiredraw down to a smaller size. Enlargement of the opening, axial extrusion, and wire drawing of the pin may all be caused by the excess metal and the extent of each may vary depending upon varying resistance factors such as the hardness of metal employed in the tubular member and pin and the resistance of the structure to enlargement of the opening.

Of the results caused by the surplus metal, some enlargement of the opening is not undesirable nor is wire drawing of the pin undesirable providing the rivet is properly set otherwise. The axial extrusion, however, is undesirable because it may move the head on the tubular member away from the structure riveted or if the structure comprises several elements, it may also cause separation of such elements.

Where a ductile metal is used in the tubular member to keep it from bursting at the end, the surplus metal beyond that required to fill up the clearance around the tubular member may cause substantial axial extrusion. In other words, a decrease in hardness of metal in the tubular member increases tendency for axial extrusion, other conditions remaining the same. Therefore, in the type of rivet under consideration, a decrease in hardness of the metal to prevent bursting of the end of the tubular member creates or accentuates another disadvantage, namely, that of axial extrusion of the tubular member.

One object of the present invention is to provide a rivet of the general type indicated and which is adapted to be inserted and set from one side only of the work wherein the tubular member is so constructed and designed that a harder and less ductile metal may be used without danger of splitting or bursting at the free end of the tulip head even though substantial expansion of the head forming portion is effected.

Another object of the invention is to provide an improved rivet of this type indicated wherein in the hole filling process, extrusion of surplus metal in the tubular member towards the performed or manufactured head is substantially prevented so as thereby to avoid movement of parts of the preformed head away from the structure or separation of the elements comprising such structure.

Another object of the invention is to provide a rivet of this type wherein a breakneck is provided on the pin which is of such character that tensile forces on the pin will more gradually reduce the diameter of the breakneck so that breaking of the pin will finally occur without any large recoil force tending to reversely move the pin and to cause shock to the riveting mechanism.

Another object of the invention is to provide a stronger rivet which can be used for riveting structures wherein the grip or thickness of the work varies through a wide range.

Another object of the invention is to provide a method of manufacturing a rivet of the type indicated so as to obtain a desired relation of strength characteristics in the pin.

Other objects of the invention will become apparent from the following description, from the drawings to which it relates and from the claims hereinafter set forth.

For a better understanding of the invention reference may be had to the accompanying drawings wherein:

Figure 3 is a fragmentary view illustrating a part of the rivet in an intermediate stage of the setting operation;

Figure 1:
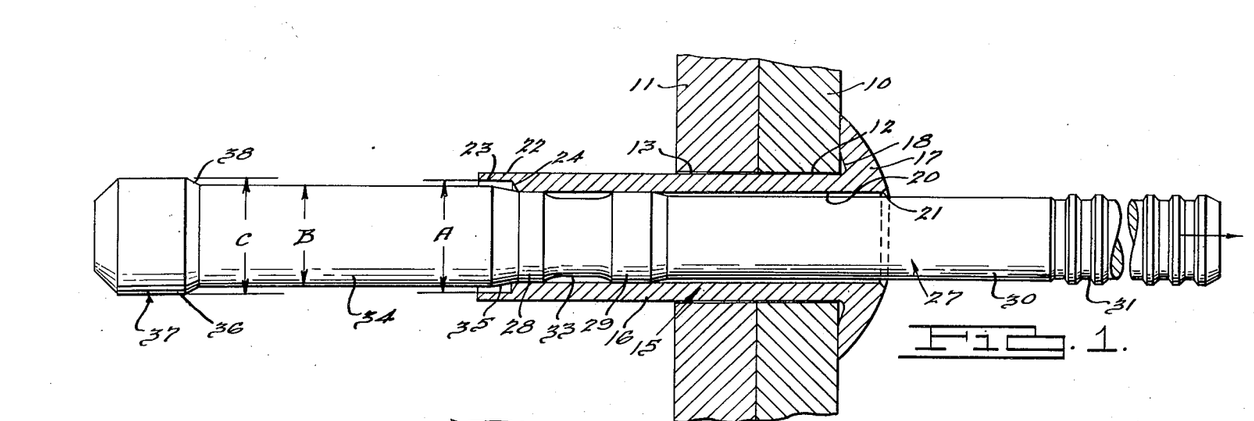
Figure 1 is a longitudinal section illustrating a rivet construction according to one form of the invention.

Referring to Figure 1, a pair of plates to be riveted is indicated at 10 and 11 and these have aligned openings 12 and 13 adapted to receive a rivet. The rivet comprises a tubular member 15 having a body portion 16 terminating at one end in a head 17 adapted to abut one side of the structure being riveted. At the junction of the body 16 and head 17, the latter has a slight, annular undercut 18 and this is provided to accommodate or receive any burrs which possibly may be present at the edge of the opening. Such burrs might in some instances prevent the head 17 from seating fully against the plate 10 and by providing the undercut 18, this objection is avoided.

The tubular member has a bore or axial opening 20 extending entirely through it and in the form shown the bore is of uniform diameter excepting at the ends. That end of the bore at the head 17 is slightly recessed as indicated at 21, and the recess thus formed is adapted to receive locking metal from the pin after the rivet is set. At its other end, the tubular member has an end section 22 having a counterbore 23 of larger internal diameter as indicated at A, and at the inner end of this counterbore an annular, tapered shoulder 24 is provided.

The rivet also includes a pin 27 projecting through the tubular member and initially projecting from both ends thereof. This pin has cylindrical portions 28 and 29 of such diameter as to have a slight press fit in the bore 20 and thus hold the parts assembled. To the right of the cylindrical portion 29, the pin is slightly reduced in diameter, as indicated at 30, thereby providing a clearance between it and the bore 20 and the outer end of this portion of the pin is provided with pull grooves 31 adapted to cooperate with jaws of a riveting mechanism. A riveting mechanism adapted to pull the pin by means of jaws engaging the grooves 31 and adapted to apply the reaction to the head 17 may correspond substantially to that shown by Huck Patent 2,053,717.

Between the cylindrical portions 28 and 29 on the pin, the surface of the latter is reduced in diameter to provide a substantially long groove or breakneck 33. The breakneck constitutes the weakest portion of the pin, and, as presently will be explained, the pin is broken at this point when the rivet is set. To the left of the cylindrical portion 28 of the pin, the latter is provided with a substantially long portion 34 of larger diameter, as indicated at B, and which joins the portion 28 by means of a long tapered shoulder 35 directed at a small angle to the axis. This portion 34 of the pin is of larger diameter than the bore 20 and the tapered shoulder 35 is provided to expand the tubular member in order to fill the holes 12 and 13 during the riveting operation.

At the left end of the portion 34 the pin has a head 37 which comprises a cylindrical portion 36, the diameter C of which is larger than the portion 34 and which joins the latter by means of an annular, tapered shoulder 38. The diameter of the cylindrical portion 36 may correspond substantially to the diameter A of the counterbore 23, although the diameter of the latter might be slightly less.

In order that particular features of the invention may be better understood it seems desirable at this point to describe generally the operation of setting a rivet where the clearance around the tubular member equals the metal expanded by the shoulder 35. The pin is gripped by the jaws of the riveting mechanism and the reaction to pull on the jaws is applied by the anvil on the mechanism to the head 17. As the pin moves, the shoulder 35 expands the body portion 16 of the tubular member projecting from the plate 11, excepting substantially for end section 22, and as it moves through that part of the body in the openings 12 and 13 the clearance will be filled.

Figure 2:
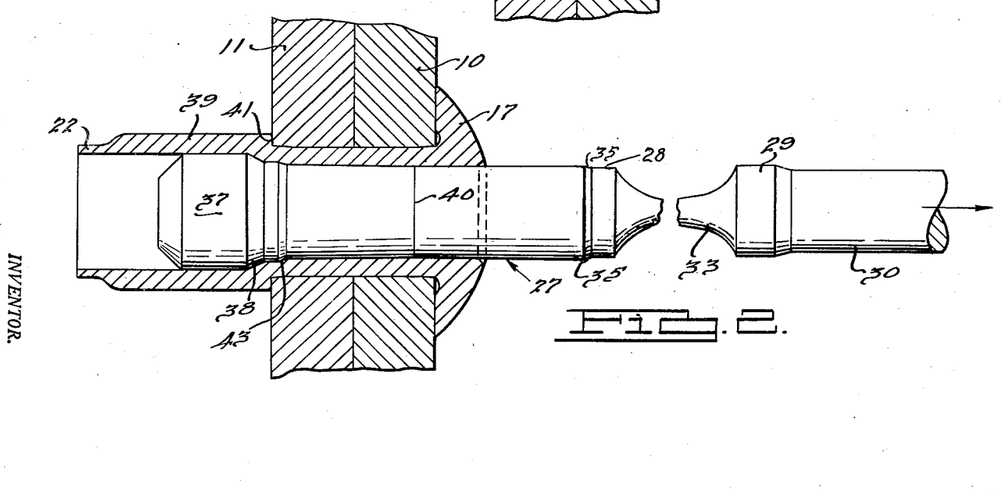
Figure 2 is a similar view illustrating the rivet after it has been set.

When the shoulder 38 forms the tulip head indicated at 39 and reaches the position shown in Figure 2, the resistance to movement of the pin increases and some "necking" of the portion 33 of the pin may occur and finally the pin breaks at the groove. The advantage of forming a reduced portion or groove 33 which may "neck down" depending upon the characteristics of the metal used, is that the necking may decrease the pull finally required to break the pin and thus reduce the recoil. This would result in a reduction of the forces tending to loosen the pin when it breaks.

Normally, however, the metal that might be expanded by the shoulder 35 is greater than the clearance in order to always insure filling the holes. Thus, in practically all cases, surplus metal will be present and as mentioned heretofore, this metal will cause either expansion of the hole, axial extrusion of the tubular member, or wiredrawing of the pin or a combination thereof. The present invention is designed to substantially prevent the axial extrusion and this is accomplished generally by using a harder metal in the tubular member, made possible without danger of bursting at the end by the section 22, and by using a pin which has the necessary tensile strength and hardness to set the rivet but which also will wiredraw to prevent axial extrusion of the tubular member.

At the same time, the invention is designed to provide a pin sufficiently strong to permit riveting wide grips, that is, thick structures, without premature pin breakage and to provide a head 37 on the pin which will not wiredraw through the tubular member after it forms the tulip head in the event a thin grip is riveted.

In accomplishing these results, the pin is so made as to have portions with different degrees of hardness as will be evident from the following description of its manufacture. A wire substantially corresponding in diameter to that of portion 34 of the pin is heat treated so as to obtain a desired degree of hardness which will effect wiredrawing before axial extrusion of the tubular member. Hence, the hardness of the tubular member will be related to the hardness of the pin portion 34. Then a wire blank is forced into an extruding die to form the long pin portion 30 which initially extends from shoulder 35 formed in the extruding die. Then head 37 is upset to a diameter larger than that shown and thereafter, the break neck 33 and pull grooves 31 may be rolled in between dies. In this operation, portions 28 and 29 also may be formed from the metal rolled out in forming the groove 33. Then the head 37 is reduced in dimensions to obtain the required diameter shown and this may be effected by extruding the head, rolling it or by cold drawing. The teeth between the grooves 31 are formed slightly larger in diameter as compared to the pin original diameter of portion 30 but are passable through the bore 20 in the tubular member during assembly.

The extrusion of the blank to form the smaller portion 30 results in increased strength and hardness in this portion and hence that portion of the pin to the right of portion 34 will be stronger and harder. The pin to the right of portion 34 therefore may be made sufficiently strong to withstand the pulling or tensile forces required in setting the rivet. At the same time, the groove 33 may be made weak enough through reduction in diameter as to effect breaking at the desired location and load in the riveting operation.

By first making the head 37 larger and then reducing it in diameter as stated, the metal is desirably cold worked to substantially increase its hardness and strength and make it more resistant to wiredrawing through the tubular member after the tulip head is formed. This is particularly important where thin grips are riveted in which event more of the pull on the pin must be opposed or taken by shoulder 38 due to the shorter length of tubular member in the structure and hence reduction in friction between the tubular member and pin.

The pin now has a head 37, the unit strength and hardness of which are substantially greater than the unit strength and hardness of portion 34. Likewise, that portion of the pin to the right of the shoulder 35 has a unit strength and hardness greater than that of the portion 34. Also, the pin to the right of the portion 34 has a greater unit tensile strength than that of said portion 34 and the head 37 has substantially greater unit resistance to wiredrawing than portion 34.

In setting the rivet with surplus metal present in the tubular member and the pin constructed with different degrees of hardness and strength as specified, movement of the shoulder 35 through the projecting portion of the tubular member effects partial formation of a tulip head as indicated at 42 in Figure 3. Then as the shoulder 35 begins to enter the structure riveted, resistance to expansion of the tubular member becomes much greater as soon as the clearance radially outwardly of the shoulder is filled. Some expansion of the hole 13 adjacent the outer face of plate 11 may occur but resistance to expansion of the hole increases inwardly from the outer face of plate 11. However, wiredrawing of the pin portion 34 also occurs and the extent of wiredrawing will depend upon the amount of surplus metal ahead of shoulder 35, the resistance to expansion of the hole and the resistance to extrusion of the tubular member. Wiredrawing will normally begin, therefore, at the point 43 and usually will be more pronounced at this point due to the lower resistance of the end of the hole to expansion.

Inwardly of the wiredrawing area 43, the pin portion 34 will continue to reduce slightly in diameter due to wiredrawing since progressively less expansion of the hole will occur. This progressive wiredrawing is indicated at 44 in Fig. 3 and it will normally continue to a point adjacent the head 17. At about this point, the end of the hole in plate 10 has less resistance to expansion and also the head may radially expand to some extent as the anvil on the gun may not prevent at least the small expansion involved. Therefore, wiredrawing normally may stop at about the line indicated at 40 in Figure 2. Figure 3 shows the rivet in a stage where the shoulder 35 is within the hole 12 and is still filling the latter and is still wiredrawing through the tubular member. Most of the inner surface of the tubular member may finally act as a wiredrawing die.

During these operations, the anvil on the riveting mechanism forcefully holds the head 17 against the structure. It is to be understood that the relation of hardness is such as to effect wiredrawing before the forces in effect will extrude the tubular member and move the head and anvil away from the structure. It should be understood that the force exerted by the anvil in resisting extrusion of the tubular member is supplementary to the resistance to extrusion of the latter due to its hardness. However, unless the pin wiredraws or the hole expands, axial extrusion might occur in spite of the anvil and move the anvil and the head 17 both away from the structure.

After the rivet is set as seen in Figure 2 and the tulip head 39 is fully formed, the increased tension on the pin resulting from increased resistance to movement caused by the different resistances involved and especially the greater resistance to movement of shoulder 38 as it reaches the plate 11, will break the pin at the groove 33 as indicated previously.

A very important advantage and characteristic of the invention also results from providing the counterbore 23 and the end section 22 on the tubular member. It will be readily appreciated that this section is not expanded at all or in any event materially less than at the bottom of the counterbore, and consequently, the end edge of the tubular portion is subjected to little or no splitting or bursting forces. Therefore, as shoulder 38 engages the shoulder 24 and the tubular projection begins to expand, the expansion occurs axially inwardly of the end of the tubular member and the forces set up in this expansion are not effective at the free end of the tubular member. It should be evident, therefore, that larger expansion may occur inwardly of the end of the tubular member without fear of rupturing the annular wall, if the end of the tubular member does not expand and is not subject to the expanding forces. In other words, it is much more difficult to burst the wall of a tubular member between its ends than it is at its end.

By providing this end section which is substantially not expanded, it is possible to expand the tubular projection inwardly of it to a greater extent than otherwise would be possible and also makes it possible to use a harder or less ductile metal in the tubular member. Consequently, with an expansion in the formation of the tulip head sufficient to provide the desired amount of abutment 41, a much harder and less ductile metal may be used. It follows that a tubular member may be used which has greater tensile, shear and bearing strength.

Furthermore, by using a pin with a larger portion 34 and smaller portion 30 having different degrees of hardness, the former will wiredraw as stated while the latter can have a high tensile strength so that it will withstand greater tensile loads without breaking. This is desirable in that the rivet can be used for connecting larger "grips," that is, for riveting thicker work. As the "grip" increases, the tulip head becomes shorter and the hole filling length and wiredrawing length become correspondingly greater. It follows that resistance to movement of the pin increases due to the greater length of frictional and wiredrawing contact between the pin portion and tubular member. By having a high tensile strength on the part of the pin to the right of the wiredrawing portion 34, the pin can withstand this higher tension or pull and accordingly the rivet can be used through a wider range of grips without premature breaking of the pin. If the entire pin were of substantially the same hardness, with the portion 34 ductile enough to wiredraw in the tubular member, the pin would break much sooner as tensile forces increased with longer grips.

Conversely, by having the head 37 on the pin stronger and harder and more resistant to wiredrawing, a thinner grip may be riveted without causing the head to pull through the tubular member past the tulip head. Where a thin grip is being riveted, the frictional and wiredrawing contact between the pin and that part of the tubular member within the structural openings 12 and 13 is relatively small due to the short length of tubular member in the openings and as a result the pull on the pin and movement thereof have to be opposed more by the head 37 and shoulder 38. By strengthening and hardening the head, its movement can be stopped after the tulip head is formed even with a thin grip and wiredrawing of the head through that portion of the tubular member located in the opening 13 is thus prevented. As a result, a thinner grip may be riveted while still effecting pin breakage before any wiredrawing of the head could occur.

From the foregoing, it is apparent that a wider range of grips may be riveted with a single size of rivet while still effecting proper setting of the rivet and breakage of the pin. In this wide range of grips, the tulip head will vary in length accordingly, but the projecting portion will be expanded to form the head in the same manner and the pin will stop moving substantially when the head 37 reaches the structure being riveted and then break under tension. Normally, the groove 33 may be outside the head 17 when the rivet is set so that the pin breaks outside such head.

Figure 4:
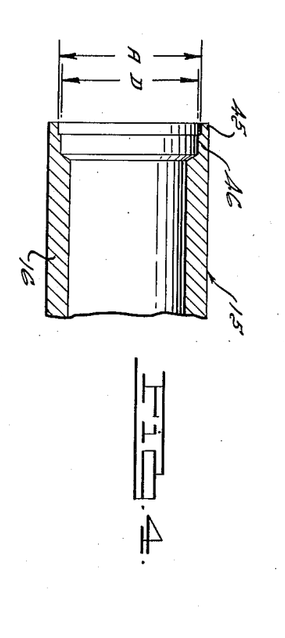
Figure 4 is a fragmentary view illustrating the end of the tubular member as constructed according to another form of the invention.

Figure 4 shows the end of the tubular member as constructed according to another form of the invention wherein instead of having an end section of uniform thickness, such as the section 22 in Figure 1, the tubular member has a shorter end section 45. The internal diameter of this short end section indicated at A preferably is the same as the diameter C of head 37 and hence this shorter end section would not be directly expanded by the head on the pin. Axially inwardly of the portion 45, a longer section 46 is provided and the diameter of this section indicated at D may be slightly smaller than the diameter A. The total axial length of the two sections 45 and 46 may correspond substantially to the length of section 22 and their respective lengths may be varied.

In the setting of this rivet, the end section 45 would not be directly expanded by the head on the pin or only slightly expanded, while the section 46 would be subjected to some expansion but this expansion would be much less than the expansion that would occur inwardly or to the right of section 46. Therefore, in this case, the tubular member has an end section 45 and a longer section 46 inwardly thereof which would be expanded substantially more than the section 45 but substantially less than the head forming part 16 of the tubular member. As the rivet is set the head 37 on the pin will expand the portion 16 so as to form a tulip head and the section 46 will resist bursting much more than the end of the portion 16 since it is not expanded as much and the extreme end portion 45 will resist bursting even more because it is not expanded at all or only slightly by the head 37.

Figure 5:
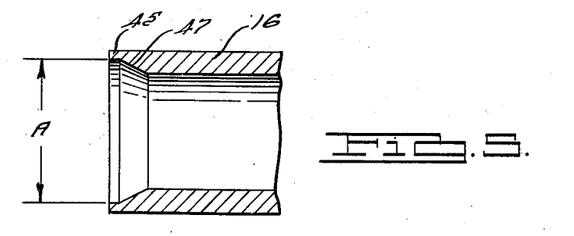
Figure 5 is a view similar to Figure 3 illustrating still another form of tubular element.

According to Figure 5, instead of having a straight section 46 inwardly of the section 45, the inner wall of the tubular member is tapered as indicated at 47, between the end of the portion 16 and the end of the section 45. When this rivet is set, the head 37 on the pin does not directly expand the section 45 or only slightly while it progressively expands the tapered portion 47. Therefore, in this case, also, the two sections 45 and 47 provide increasing resistance to bursting.

Figure 6:
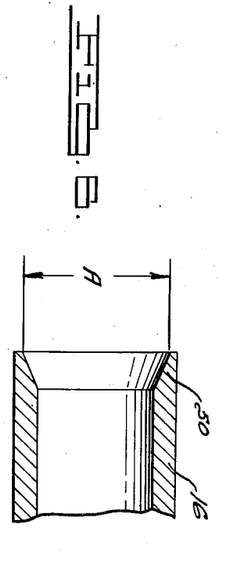
Figures 6, 7, and 8, are also views similar to Figures 3 and 4 illustrating end structures on the tubular member provided in accordance with other forms of the invention.

In the form of the invention shown by Figure 6, instead of using separate sections 45 and 46, or 45 and 47, as embodied in Figures 4 and 5, a single end section 50 is provided which tapers from a diameter A at the extreme end to the end of the portion 16. Hence, at the extreme end face of the section 50, no direct expansion or only slight expansion will occur when the head of the pin moves into the tubular member, and inwardly of this end face, the expansion will progressively increase. Likewise, in this case there is little or no force at the end face for causing bursting, and inwardly of the end face the expansion is progressive so as to progressively reinforce against bursting.

Figure 7:
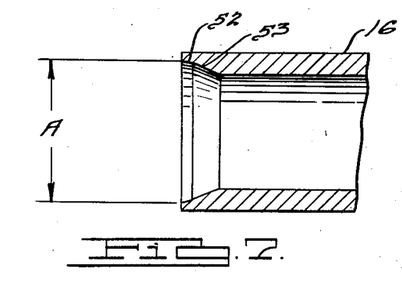

Figure 7 illustrates a form of tubular member wherein the end section comprises a first tapered portion 52 and a second tapered portion 53. The diameter of the extreme end of the portion 52 is indicated at A and substantially corresponds to the pin head diameter C in Fig. 1 so that there is no direct or only slight expansion of the end face of the tubular member. The taper on the portion 52 is slight, and the taper on the portion 53 is substantially greater. Hence, in setting this rivet slight expansion occurs and progressively along the portion 52, and then this expansion increases and also progressively along the portion 53. This action is somewhat distinguished from the expansive action effected in the other structures, but generally a similar result is accomplished in that the tubular member is expanded inwardly of the extreme end thereof with substantially no expansion at the end face where bursting ordinarily would begin due to poor resistance to bursting. These forces tending to tear or split the metal increase gradually inwardly from the end of the member, but at the same time the resistance to splitting increases due to the fact that it is more difficult to split the metal intermediate its ends and away from the end edge or end face.

Figure 8:
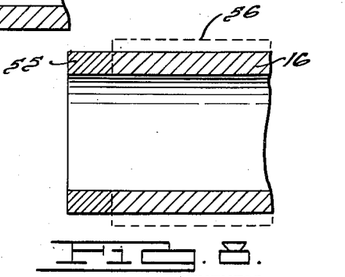

In the form of tubular member shown by Figure 8, the end of the tubular member instead of having a section 22 of smaller internal diameter is provided with a section 55 which is not as hard or strong as the remainder of the tubular member. This more ductile section will not burst or tear as easily and therefore the harder portion of the projecting tubular member can be expanded a greater amount than otherwise without bursting of its end.

In making this type of rivet, the tubular body may initially be formed with more ductility such as may correspond to the ductility or degree of hardness and strength desired in section 55 and axially beyond this section the body may be of greater diameter as indicated in broken lines 56. Then this portion of larger diameter may be rolled down or extruded to reduce the outer diameter to that shown. This results in cold working and hardening of the body axially inwardly of the section 55 so as to obtain a greater degree of hardness and strength.

After the rivet is set, the projecting part of the shank or pin may be cut off next to the head 17 and the cutting off tool may be in the form of a wire cutter of such character that some metal in the pin will be upset radially into the recess 21. While friction normally will keep the pin in place, the metal in recess 21 will provide a positive lock to prevent the pin from falling out.

It is evident that instead of using a rounded head 17, the rivet may be of the flush type where the head is frusto-conical and seats in a countersunk recess in sheet 10. This type of head may also be used with the dimple type rivet opening. In other words, the invention is applicable for use in dimple or countersunk riveting and in riveting where the head stands above the surface of the structure riveted. It should be understood that in flush riveting, the riveting mechanism will have a flat anvil instead of a concave anvil so as to fit the rivet head.

Although more than one form of the invention has been illustrated and described in detail, it will be apparent to those skilled in the art that various modifications may be made without departing from the scope of the appended claims.

What is claimed is:

1. A rivet comprising a tubular element adapted to project through a structure to be riveted and beyond one side thereof and having a head on one end for engaging the other side of the structure, a pin projecting through the tubular element and having a head on one end for movement into that portion of the element projecting from the structure and which is of such size as to expand the latter and form an enlarged tubular projection telescoped over said head, and means on the outer end of said portion of the tubular element for preventing bursting thereof while still permitting the head on the pin to move through and past said means, said means comprising an annular section of the tubular member which is more ductile than the tubular portion axially inwardly thereof, said tubular element being of substantially uniform internal diameter from said head on one end to a point adjacent said annular section.

2. A rivet comprising a tubular element adapted to project through a structure to be riveted and beyond one side thereof and having a head on one end for engaging the other side of the structure, a pin projecting through the tubular element and having a head on one end for movement into that portion of the element projecting from the structure and which is of such size as to expand the latter and form an enlarged tubular projection telescoped over said head, and means on the outer end of said portion of the tubular element for preventing bursting thereof while still permitting the head on the pin to move through and past said means, said means comprising an outer end section of said portion having its inner periphery progressively reduced in an axial direction so as to modify the bursting forces thereon when said head enters said end, said tubular element being of substantially uniform internal diameter from said head to a point adjacent said outer end section.

3. A rivet comprising a tubular member having a preformed head on one end adapted to engage one side of a structure to be riveted and a body portion adapted to project through a hole in the structure and beyond the other side of the latter, and a pin projecting through the tubular member and having a radially enlarged portion adapted to move through the body and expand it to fill the hole, an end portion of reduced diameter projecting from said enlarged pin portion and from said preformed head, and a head on its other end for expanding that portion of the body projecting from the structure so as to form a head when said end portion of the pin is pulled and the reaction to the pull is applied against the preformed head on the tubular member, the unit hardness of said enlarged pin portion being less than the unit hardness of the smaller pin portion and being so related to the hardness of the tubular body that wire-drawing of such larger pin portion will occur before that part of the tubular body axially in advance of such enlarged portion will extrude axially in the direction of pull on the pin.

4. A rivet comprising a tubular member having a preformed head on one end adapted to engage one side of a structure to be riveted and a body portion adapted to project through a hole in the structure and beyond the other side of the structure, and a pin projecting through the tubular member and having a radially enlarged portion adapted to move through the body and expand it to fill the hole, an end portion of reduced diameter projecting from said enlarged pin portion and from said preformed head, and a head on its other end for expanding that portion of the body projecting from the structure so as to form a head when said end portion of the pin is pulled and the reaction to the pull is applied against the preformed head on the tubular member, the unit hardness of said enlarged pin portion being less than the unit hardness of said head on the pin and less than the unit hardness of the smaller pin portion and being so related to the unit hardness of the tubular body that wiredrawing of such larger pin portion will occur before that part of the tubular body axially in advance of said enlarged portion will extrude axially in the direction of pull on the pin.

5. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the unit hardness of the intermediate portion of the pin being less than the unit hardness of the smaller pin portion, and being so related to the unit hardness of the tubular body that wiredrawing of such intermediate portion will occur before that portion of the body axially in advance thereof will extrude axially in the direction of pull.

6. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the unit strength of the intermediate portion of the pin being less than the unit strength of the smaller pin portion and being so related to the unit strength of the tubular body that wiredrawing of the intermediate portion of the pin will occur before that portion of the body axially in advance thereof will extrude axially in the direction of pull.

7. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the unit resistance of the intermediate portion of the pin to wiredrawing being less than that of the smaller pin portion and being so related to the resistance of the tubular member to extrusion that wiredrawing of said pin portion will occur prior to extrusion of that portion of the tubular body in advance thereof.

8. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the unit resistance of the intermediate portion of the pin to wiredrawing being less than that of the smaller pin portion and head on the pin and being so related to the resistance to extrusion of the tubular body that wiredrawing of said intermediate body will occur prior to extrusion of that portion of the tubular body in advance thereof.

9. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the unit hardness of said smaller and intermediate portions of the pin being different.

10. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the intermediate pin portion having less unit tensile strength and resistance to wiredrawing than that of the smaller pin portion.

11. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the head on the pin having greater unit resistance to wiredrawing than that of the intermediate pin portion.

12. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the resistance to wiredrawing of the intermediate portion being so related to the resistance of the tubular body to axial extrusion that it will wiredraw before extrusion of the body occurs, and the smaller portion of the pin having a weaker section designed to break prior to occurrence of substantial wiredrawing of the pin head through that portion of the tubular body adapted to be disposed in the hole.

13. A rivet comprising a tubular member having a preformed head on one end adapted to engage one side of a structure to be riveted and a body portion adapted to project through a hole in the structure and beyond the other side of the latter, and a pin projecting through the tubular member and having a radially enlarged portion adapted to move through the body and expand it to fill the hole, an end portion of reduced diameter projecting from said enlarged pin portion and from said preformed head, and a head on its other end for expanding that portion of the body projecting from the structure so as to form a head when said end portion of the pin is pulled and the reaction to the pull is applied against the preformed head on the tubular member, the unit hardness of said enlarged pin portion being less than the unit hardness of the smaller pin portion.

14. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the metal in smaller diameter of pin being cold worked more than the intermediate pin portion.

15. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the metal in the pin head and in the smaller pin portion being cold worked more than the intermediate pin portion.

16. A rivet comprising a tubular member having a preformed head on one end adapted to engage one side of a structure to be riveted, an intermediate body portion adapted to project through a hole in the structure and an end portion adapted to project from the other side of the structure, and a pin projecting through the tubular member and having a radially enlarged intermediate portion adapted to move through the body and to expand it to fill the hole, a portion of smaller diameter projecting from said enlarged pin portion and from said preformed head, and a head on its other end adapted to move into said end portion of the tubular member and to expand it so as to form an enlarged tubular head telescoped over the pin head when the smaller end of the pin is pulled and the reaction to the pull is applied against the preformed head on the tubular member, the pin head being cold worked more than the intermediate portion of the pin.

17. A rivet comprising a tubular member having a preformed head at one end adapted to engage one side of a structure to be riveted and a body portion adapted to extend through a hole in the structure and to project beyond the other side of the latter, and a pin projecting through the tubular member and having a radially enlarged portion adapted to move through the projecting body portion to expand it and then to move through and expand the body portion in said hole to fill the latter and simultaneously wire draw to a smaller diameter as required in filling the hole and permitting the continued pin movement, said pin also having a smaller portion projecting from the preformed head and having a head at its other end for engaging the projecting body portion of the tubular member and limiting the pin movement.

18. A rivet comprising a tubular member having a preformed head at one end adapted to engage one side of a structure to be riveted and a body portion adapted to extend through a hole in the structure and to project beyond the other side of the latter, and a pin projecting through the tubular member and having a radially enlarged portion adapted to move through the projecting body portion to expand it and then to move through and expand the body portion in said hole to fill the latter and simultaneously wire draw to a smaller diameter as required in filling the hole and permitting the continued pin movement, said pin also having a smaller portion projecting from the preformed head and having a head at its other end for engaging the projecting body portion of the tubular member and limiting the pin movement, the unit hardness of said enlarged pin portion being less than the unit hardness of the smaller pin portion.

19. A rivet assembly comprising a tubular member adapted to extend through openings in a structure to be riveted and having a head at one end for engaging one side of the structure and adapted to project from the other side of the structure so as to provide a projection for expansion, a pin extending through the tubular member and from the head so that the pin may be pulled relative to the member, the other end of the pin having an annular shoulder operating upon pulling of the pin to first move through and expand the projecting portion of the member and then to wire draw down to a smaller diameter as required to move on through the portion of the member located in the openings, the head on the pin operating to engage the expanding tubular portion and to stop the pin movement.

20. A rivet assembly comprising a tubular member adapted to extend through openings in a structure to be riveted and having a head at one end for engaging one side of the structure and adapted to project from the other side of the structure so as to provide a projection for expansion, a pin extending through the tubular member and from the head so that the pin may be pulled relative to the member, the other end of the pin having an annular shoulder operating upon pulling of the pin to first move through and expand the projecting portion of the member and then to wire draw down to a smaller diameter as required to move on through the portion of the member located in the openings, the head on the pin operating to enter and expand the projecting portion of the tubular member so as to expand it additionally and to stop the pin movement when the head reaches a position at the inner end of the projecting portion.

21. For use in a two part fastening device including a tubular element and a pin adapted to be pulled through the structure to be fastened when the fastener is set, a pin having a smaller shank portion to be pulled, and a radially larger portion at the inner end of such shank portion which is adapted to wire draw down to a smaller diameter in filling the hole in the structure when the pin is pulled therethrough, the unit hardness of the smaller shank portion being greater than the unit hardness of the larger portion.

22. For use in a two part fastening device, including a tubular element and a pin adapted to be pulled through the structure to be fastened when the fastener is set, a pin having a smaller shank portion to be pulled, a radially larger portion at the inner end of such shank end portion which is adapted to wire draw down to a smaller diameter in filling the hole in the structure when the pin is pulled therethrough, and a head on the pin at the end opposite the smaller shank portion which is adapted to limit the movement of the pin, the unit hardness of the smaller shank portion being greater than the unit hardness of the larger portion.

LOUIS C. HUCK.

REFERENCES CITED

The following references are of record in the file of this patent:

UNITED STATES PATENTS

| Number | Name | Date |
| --- | --- | --- |
| 2,061,629 | Huck | Nov. 24, 1936 |
| 2,248,755 | Hathorn | July 8, 1941 |